Figure 1:
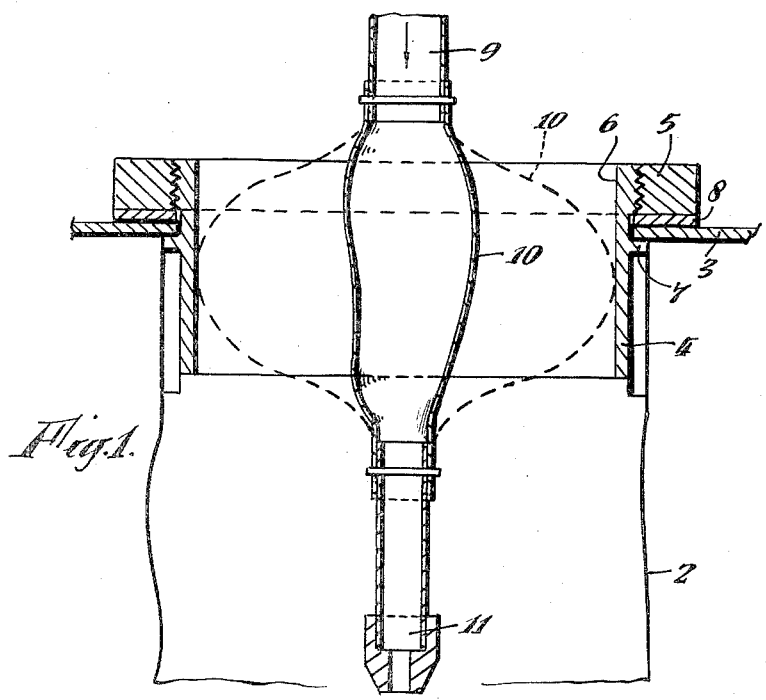

Jan. 26, 1965   H. A. EDWARDS   3,167,415
CLEANING DEVICES FOR GAS FILTERING APPARATUS
Filed Oct. 31, 1960   2 Sheets-Sheet 1

Inventor
Harold Anthony Edwards
by Albert Jacobs
Attorney

United States Patent Office 3,167,415
Patented Jan. 26, 1965

3,167,415
CLEANING DEVICES FOR GAS FILTERING
APPARATUS
Harold Anthony Edwards, Clevedon, England, assignor to
Nailsea Engineering Company Limited, Nailsea, England, a company of Great Britain and Northern Ireland
Filed Oct. 31, 1960, Ser. No. 66,161
Claims priority, application Great Britain, Nov. 2, 1959, 37,153/59
6 Claims. (Cl. 55—302)

This invention relates to cleaning devices for air or other gas filtering apparatus hereinafter referred to as air filtering apparatus, more particularly to the kind of device for use in a reverse flow system of filter cleaning wherein high pressure air or gas hereinafter referred to as air is blown through the filter medium in the opposite direction to the normal flow of dirty air to remove the solid matter adhering to the dirty side of the said filter medium.

According to this invention a cleaning device comprises an air inlet pipe for introducing high pressure air into a filter chamber in the reverse direction to the normal flow and means for temporarily closing the cleaned air outlet from said chamber, said closing means being operated into the closed position by means of the said high pressure air.

Three forms of cleaning device made according to this invention are illustrated in the accompanying drawings wherein the figures are sectional elevations each showing a different form.

Referring to the drawings, the cleaning device is applied to the mouth of a vertically suspended filter bag 2 the upper end portion of which is supported by a partition 3 in a housing, said partition separating the dust-laden air or dirty air in the lower part of the housing from the cleaned air in the upper part of the housing. The filtering operation consists in introducing the dirty air into the housing at or near the bottom thereof whereupon the cleaned air passes through the filter bag and out through the open mouth thereof into the upper part of the housing. The dust adheres to the outside of the bag.

In FIGURE 1 the cleaning device comprises a cylindrical sleeve 4 depending into the upper end portion of the filter bag 2 and fixed to the partition in any convenient manner, for example by means of a lock nut 5 which engages a corresponding thread on the upper end portion 6 of the sleeve which projects above the partition 3. An annular shoulder 7 on the sleeve 4 bears on the underside of the partition 3 and serves to clamp the sleeve to the partition when the lock nut 5 is tightened. The peripheral edge of the filter bag 2 is sandwiched between the partition 3 and a washer 8 located under the lock nut 5.

An air inlet pipe 9 from a source of high pressure air is arranged on the axis of the filter bag 2 the lower end terminating above the mouth of the bag. An inflatable bladder 10 is fixed to the lower end of the said air inlet pipe 9 and a nozzle 11 is fixed to the lower end of the bladder 10 opposite to the said pipe 9, the nozzle 11 being inside the bag 2. When the bladder 10 is inflated it bears on the inner surface of the sleeve 4 and seals the mouth of the filter bag.

In use, when it is desired to clean the bag 2, high pressure air is blown down the air inlet pipe 9 first filling the bladder 10 which in the distended position bears on the sleeve 4 to close the mouth of the bag and then through the nozzle 11 into and through the bag 2 to remove the dust on the outer surface thereof.

It must be understood that a number of bags are provided in one housing and each bag is fitted with a cleaning device as described. While one bag is being cleaned the rest of the bags in the housing are operating in the normal way. Alternatively, a group of bags may be cleaned at one time but this group would represent a small proportion of the total number of bags.

Figure 2:
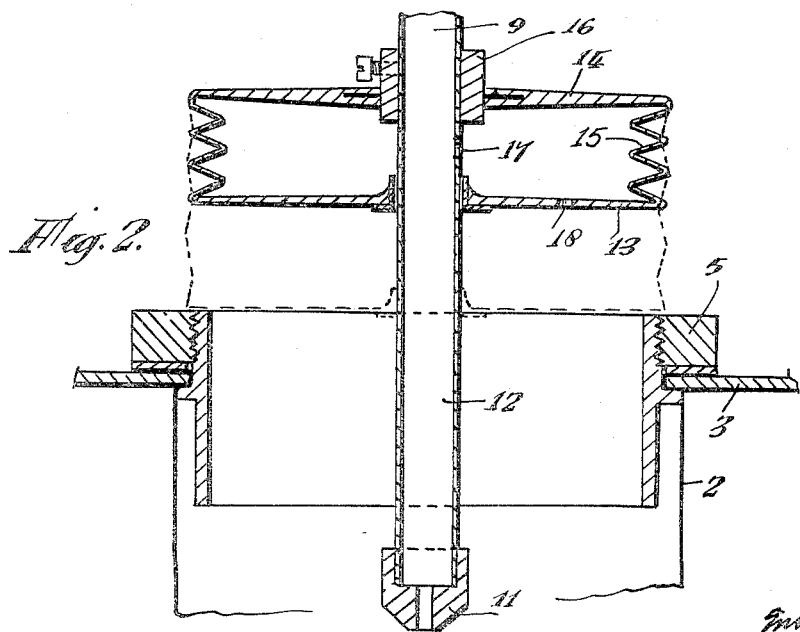

In FIGURE 2 in stead of providing a bladder 10 to seal the mouth of the bag the air inlet pipe 9 is directly joined to the nozzle 11, through an extended length of tube 12 and the means for closing the mouth while the cleaning operation is being carried out comprises an annular plate 13 mounted for vertical sliding movement on the air inlet pipe 9, said plate 13 being slightly larger than the mouth of the bag and adapted to seat on the area surrounding the opening. The periphery of the said slidable plate 13 is connected to a fixed annular plate 14 immediately above it by bellows 15 the function of which is to pull the slidable plate 13 away from the opening when the cleaning operation is finished. The said fixed plate 14 is mounted on the air inlet pipe 9 by means of a collar 16. An aperture 17 is provided in the inlet pipe 9 below the fixed plate 14 and one or more apertures 18 are provided in the slidable plate 13.

In use, high pressure air is blown down the air inlet pipe 9 first passing through the aperture 17 into the space between the fixed and slidable plates 14, 13 causing the slidable plate 13 to move into the closed position against the upward pressure of the bellows 15, after which the high pressure air passes through the air inlet pipe to the nozzle 11 to effect the cleaning operation. When the air pressure is released the bellows 15 returns the slidable plate 13 to the normal position.

According to a simplified version of the device just described the nozzle is dispensed with, and the air inlet pipe terminates a short distance below the fixed plate. In operation the high pressure air first passes into the space between the fixed and slidable plates and from thence directly into the filter bag through a plurality of apertures in the slidable plate. Alternatively the pipe can be dispensed with altogether, in which case the high pressure air enters directly through an aperture in the fixed plate.

Figure 3:
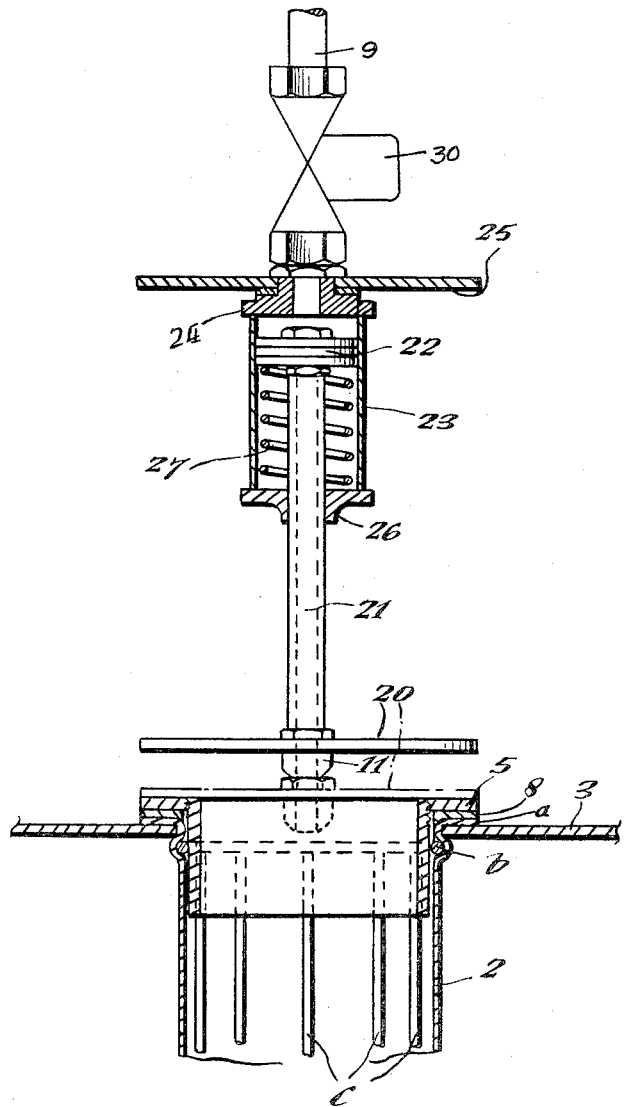

Referring to FIGURE 3, the filter bag with its supporting frame is suspended from the partition 3, the peripheral edge portion a of the filter bag 2 being sandwiched between the partition 3 and the washer 8 when the nut 5 is tightened as in the previously described examples. The frame comprises a ring b to which is welded at spaced intervals vertical members c. The ring b bears on the underside of the partition 3 and serves the same purpose as the shoulder 7 in the previous examples.

A movable plate 20 forms the means for closing the mouth of the bag while the cleaning operation is being carried out, said movable plate 20 being fixed at the lower end of an inlet pipe 21. The nozzle 11 is provided below the plate 20. The upper end portion of the pipe 21 carries a piston 22 working in a cylinder 23, the upper end 24 of which is fixed to the plate 25. The pipe 21 makes a sliding fit with a central bore in the end plate 26 of the cylinder. A coil spring 27 is arranged between the piston 22 and the plate 26.

In use, high pressure air is blown down the inlet pipe 9 through a remotely controlled valve 30 into the cylinder, the spring 27 being of such strength as to allow the piston 22 to move down until the plate 20 closes the mouth of the bag, the high pressure air passes through the pipe 21 into the bag 2 through the nozzle 11. When the cleaning operation is finished the high pressure air is shut off and the spring 27 returns the piston 22 to its normal position thereby raising the plate 20 from its seat at the mouth of the bag 2.

The term "high pressure air" is intended to cover any pressure higher than that at which the cleaned air emerges from the cleaned air outlet.

What I claim and desire to secure by Letters Patent is:

1. A cleaning device for air filtering apparatus including a filter chamber defined by side and bottom walls joined to form an enclosure having an opening at the top, said device comprising a high pressure reverse flow air inlet pipe, means connected thereto for controlling passage of air, a cylinder communicating with said high pressure air inlet pipe, a piston disposed within said cylinder and movable therein in response to air pressure, an air passage pipe extending downwardly from within said cylinder and the upper end of which is connected to and extends through said piston for receiving high pressure air entering said cylinder above said piston, a nozzle affixed to the distal end of said air passage pipe and filter chamber closing means for temporarily closing the opening at the top of said filter chamber, on the downstream cleaned air side of said chamber, the said closing means being attached to said nozzle so that said nozzle protrudes therethrough.

2. A cleaning device according to claim 1, wherein said cylinder is provided with top and bottom centrally bored end plates and resilient piston return means in said cylinder below said piston and wherein said air passage pipe is slidably mounted with respect to the bottom plate of said cylinder.

3. A cleaning device according to claim 2, wherein the resilient piston return means is a helical spring and wherein the filter chamber closing means is a plate having an axially aligned hole therethrough so that at least a portion of said nozzle extends through the hole in said plate below said plate.

4. A cleaning device for air filtering apparatus in combination with a filter chamber defined by side and bottom walls joined to form an enclosure having an opening at the top wherein said device comprises a high pressure reverse flow air inlet pipe, a cylinder communicating with said high pressure air inlet pipe, a valve interposed between said inlet pipe and said cylinder for the control of air flow, a movable piston disposed within said cylinder, an air passage pipe the upper end of which extends into said cylinder, and which is attached at its upper end to said piston and extended through said piston, a nozzle affixed to the distal end of said air passage pipe, and filter chamber closing means for temporarily closing the opening at the top of said filter chamber connected to said nozzle so that at least a portion of said nozzle protrudes therethrough, said filter chamber closing means being movable axially with respect to said filter chamber.

5. A cleaning device according to claim 4, wherein said cylinder is provided with centrally bored upper and lower end plates and resilient piston return means around the upper end of said pipes, said air passage pipe being slidable through the bore in the lower plate of said cylinder.

6. A cleaning device for air filtering apparatus in combination with a filter chamber defined by side and bottom walls joined to form an enclosure having an opening at the top wherein said device comprises a high pressure reverse flow air inlet pipe, a subjacent plate having an opening therethrough, a valve connected at its upper end with said inlet pipe and connected at its lower end with the opening in said plate, a cylinder having central bored end plates and being attached by its upper end plate to the underside of said plate, a movable piston disposed within said cylinder, a resilient spring disposed within said cylinder between the lowermost portion of said piston and the bottom of said cylinder, an air passage pipe connected to and extending through said piston and movable therewith, a nozzle connected to the distal end of said air passage pipe and a filter chamber closing plate on the downstream cleaned air side of said chamber, said plate having a hole through which said nozzle extends so that at least a portion of said nozzle projects below said plate, said filter chamber closing plate being movable to close and open said filter chamber.

References Cited in the file of this patent

UNITED STATES PATENTS

| 1,538,292 | Lindsay | May 19, 1925 |
| 2,368,787 | Skinner | Feb. 6, 1945 |
| 2,804,168 | Church | Aug. 27, 1957 |
| 2,889,892 | Schaub et al. | June 9, 1959 |

FOREIGN PATENTS

| 796,414 | Great Britain | June 11, 1958 |
| 812,244 | Great Britain | Apr. 22, 1959 |